A. B. STONE.
Railroad Rail Joints.
No. 134,174.            Patented Dec. 24, 1872.
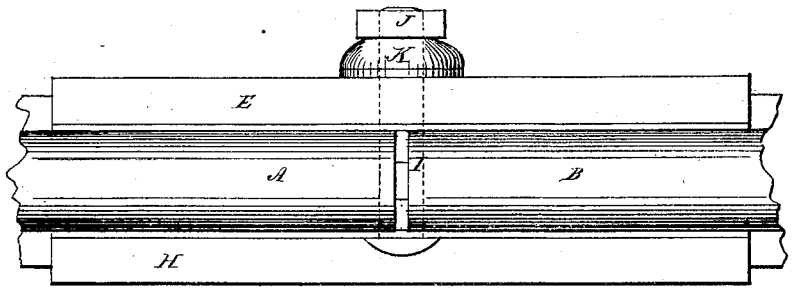
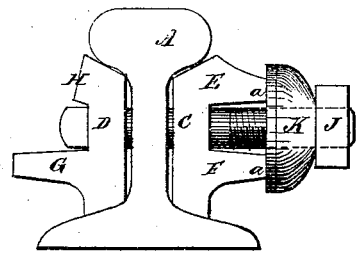
Witnesses
John A. Ellis.
C. Alexander
Inventor
Andross B. Stone,
Per
C. H. Watson
Atty.

UNITED STATES PATENT OFFICE.

ANDROS B. STONE, OF CLEVELAND, OHIO.

IMPROVEMENT IN RAILROAD-RAIL JOINTS.

Specification forming part of Letters Patent No. 134,174, dated December 24, 1872.

*To all whom it may concern:*

Be it known that I, ANDROS B. STONE, of Cleveland, county of Cuyahoga and State of Ohio, have invented certain new and useful Improvements in Railroad Splices:

And it consists in the construction of the splice-plates to allow greater elasticity to the material used where the said elastic material does not extend the entire length of the splice, and where the same is used in connection with a single bolt, plates, and rails, as hereinafter more fully described and pointed out by the claim; and I do hereby declare that the following is a full, clear, and exact description thereof, which will enable others skilled in the art to make and use the same, reference being had to the accompanying drawing, with letters of reference marked thereon, forming a part of this specification, in which—

Figure 1 is a plan or top view of a device embodying my invention, and Fig. 2 is a cross-section of the same.

A and B represent the rails; C D, the side plates bearing upon the upper and lower flanges of the rail, and leaving a space between said plates and the web of the rails. E, F, G, and H represent outward extending flanges upon the plates C D. The head of the bolt I fits between the flanges G H. I represents a bolt passing through the plates C D and between the rails A B, the said rails having an opening of sufficient size to receive said bolt. J represents the nut upon the bolt I, and K the elastic washer.

In using a single bolt, I, with the elastic material having a bearing upon its entire surface, as is usual where the elastic material extends the entire length of the splice, sufficient elasticity is not obtained. I overcome this difficulty by extending the flanges E and F outward so as to form the projections *a a* upon which the elastic washer K rests, leaving an open space between the bolt I and the projections *a a*, thereby allowing a greater elasticity to the washer than it would if the inside of the washer had a bearing upon its entire inside surface.

Having thus fully described my invention, what I claim, and desire to secure by Letters Patent, is—

The projections *a a* formed upon the flanges E F, and used in connection with the elastic washer K, bolt I, nut J, clamps C D, and rails A B, substantially as and for the purpose herein set forth.

ANDROS B. STONE.

Witnesses:
 T. R. SCOWDEN,
 W. H. BURRIDGE.